United States Patent [19]
Iwamoto

[11] 3,930,195
[45] Dec. 30, 1975

[54] ELECTRICAL CIRCUIT HAVING A PAIR OF THYRISTORS

[75] Inventor: Hideo Iwamoto, Itami, Japan

[73] Assignee: Mitsubishi Denki Kabushiki Kaisha, Tokyo, Japan

[22] Filed: June 14, 1974

[21] Appl. No.: 479,442

[52] U.S. Cl. .......................... 321/45 C; 307/252 M
[51] Int. Cl.² ......................................... H02M 7/515
[58] Field of Search ............ 321/43, 44, 45 R, 45 C; 318/341; 307/252 M, 252 J

[56] References Cited
UNITED STATES PATENTS

| | | | |
|---|---|---|---|
| 3,328,668 | 6/1967 | Nolan et al. | 321/45 R |
| 3,544,818 | 12/1970 | Harris | 307/252 J |
| 3,667,021 | 5/1972 | Anderson et al. | 321/45 C |

FOREIGN PATENTS OR APPLICATIONS

| | | | |
|---|---|---|---|
| 5-5284 | 2/1970 | Japan | 321/45 R |
| 1,031,466 | 6/1966 | United Kingdom | 321/45 R |

*Primary Examiner*—William M. Shoop
*Attorney, Agent, or Firm*—Oblon, Fisher, Spivak, McClelland & Maier

[57] ABSTRACT

An electrical circuit comprises a pair of thyristors which inversely control each other whereby one thyristor is turned on while the other thyristor is turned off. When each thyristor is turned off, the turn-off time is shortened by applying a reverse bias between the gate and cathode of the thyristor by an inverse bias circuit which comprises a pair of transformers which applies a reverse bias between the gate and cathode of the thyristor to be turned off.

11 Claims, 7 Drawing Figures

ELECTRICAL CIRCUIT HAVING A PAIR OF THYRISTORS

BACKGROUND OF THE INVENTION

1. Field of the Invention

The present invention relates to an electrical circuit having a pair of thyristors which inversely control each other whereby one thyristor is turned on while the other thyristor is turned off.

2. Description of the Prior Art

Inverters having thyristors for converting DC power to AC power have been used. Most thyristor type inverters have at least one pair of thyristors. The pair of thyristors used for the inverter are inversely operated whereby one thyristor is turned on while the other thyristor is turned off. A commutation circuit element such as a capacitor, a reactor, etc. is used for controlling the pair of thyristors. The commutation circuit element applies a reverse voltage between the anode and cathode of the thyristor to turn off the thyristor.

The reverse voltage applied by the commutation circuit element should be applied to the thyristor for a time period longer than the time period required for turning off the thyristor. The longer the time period required, the larger the commutation circuit element must be.

In order to use a compact commutation circuit element, the turn-off time of the thyristor should be shortened. When the thyristor is operated with a frequency of several to several tens KHz in an electrical circuit for high power and high frequency, a turn-off time of less than 5 – 20μs is required. Although it has been known to apply inverse bias between the gate and cathode of the thyristor together with the reverse voltage to shorten the turn-off time of the thyristor when turning off the thyristor, it has not been practically used because the circuitry for imparting the inverse bias is quite complex.

SUMMARY OF THE INVENTION

Accordingly, it is an object of the present invention to provide an improved electrical circuit comprising an inverse bias circuit of simple design which utilizes the inverse operation of a pair of thyristors to shorten the turn-off time of the thyristors. This object of the present invention as well as others has been attained by providing an electrical circuit comprising at least one pair of thyristors each having an anode, cathode and gate; the first thyristor being turned off when turning on the second thyristor and the second thyristor being turned off when turning on the first thyristor; a pair of transformers; the first transformer applying reverse bias voltage between the gate and cathode of the second thyristor when the first thyristor is turned on; the second transformer applying reverse bias voltage between the gate and cathode of the first thyristor when the second thyristor is turned on.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
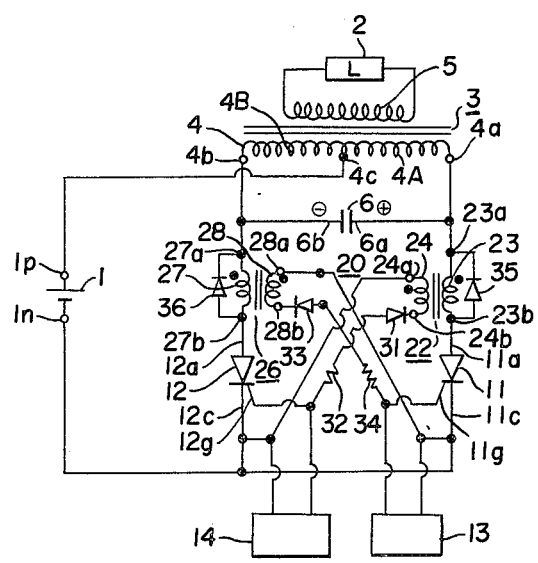
FIG. 1 is an electrical circuit diagram showing a first type inverter according to the invention.

FIG. 1 shows a parallel type inverter having an electrical circuit according to the invention. The inverter comprises a DC power source 1 such as a battery, an AC load 2, a transformer 3, a commutation capacitor 6, a pair of thyristors 11, 12 and an inverse bias circuit 20. The DC power source 1 has a positive terminal 1p and a negative terminal 1n. The transformer 3 has an input coil or primary coil 4 and an output coil or secondary coil 5 and the AC load 2 is connected between the terminals of the secondary coil 5. The primary coil 4 has terminals 4a, 4b and a middle terminal 4c between both of the terminals 4a, 4b whereby the coil between the terminals 4a, 4c forms the first coil part 4A and the coil between the terminals 4c, 4b forms the second coil part 4B. The middle terminal 4c of the primary coil 4 is connected to the positive terminal 1p of the DC power source 1. The commutation capacitor 6 has a pair of terminals 6a, 6b which are respectively connected to the terminals 4a, 4b of the primary coil 4. The thyristors 11, 12 are, respectively, three terminal thyristors. The thyristor 11 has three terminals, anode 11a, cathode 11c and gate 11g. The thyristor 12 has three terminals; anode 12a, cathode 12c and gate 12g. The cathodes 11c, 12c of the thyristors 11, 12 are connected to the negative terminal 1n of the DC power source 1.

An ignition circuit 13 is connected between the gate 11g and the cathode 11c of the thyristor 11 and the ignition circuit 14 is connected between the gate 12g and the cathode 12c of the thyristor 12. The ignition circuits 13, 14 may be conventional and apply each ignition signal between the gate and cathode of the thyristor when turning on each thyristor 11, 12. The ignition signal gives a positive polarity to each gate 11g, 12g and a negative polarity to each cathode 11c, 12c. The inverse bias circuit 20 comprises a pair of transformers 22, 26 which comprise primary coils 23, 27 and secondary coils 24, 28. The primary coil 23 of transformer 22 has a pair of terminals 23a, 23b. The terminal 23a is connected to the terminal 4a of the primary coil 4 of the main transformer 3 and the terminal 23b is connected to the anode 11a of the thyristor 11. The primary coil 27 of the transformer 26 comprises a pair of terminals 27a, 27b. The terminal 27a is connected to the terminal 4b of the primary coil 4 of the main transformer 3 and the terminal 27b is connected to the anode 12a of the thyristor 12. The secondary coil 24 of the transformer 22 has a pair of terminals 24a, 24b. The terminal 24a of the secondary coil 24 is connected to the cathode 12c of the thyristor 12 and the terminal 24b is connected through the diode 31 and the resistor 32 to the gate 12g of the thyristor 12. The terminal 28a of the secondary coil 28 is connected to the cathode 11c of the thyristor 11 and the terminal 28b is connected through the diode 33 and the resistor 34 to the gate 11g of the thyristor 11.

The cathodes of diodes 31, 33 are connected to terminals 24b, 28b. Fly-wheel diodes 35 36 are connected in parallel to primary coils 23, 27 of transformers 22, 26. The cathodes of diodes 35, 36 are connected to terminals 23a, 27a of primary coils 23, 27. The polarity of each transformer is shown by a dot in FIG. 1.

Figure 2:
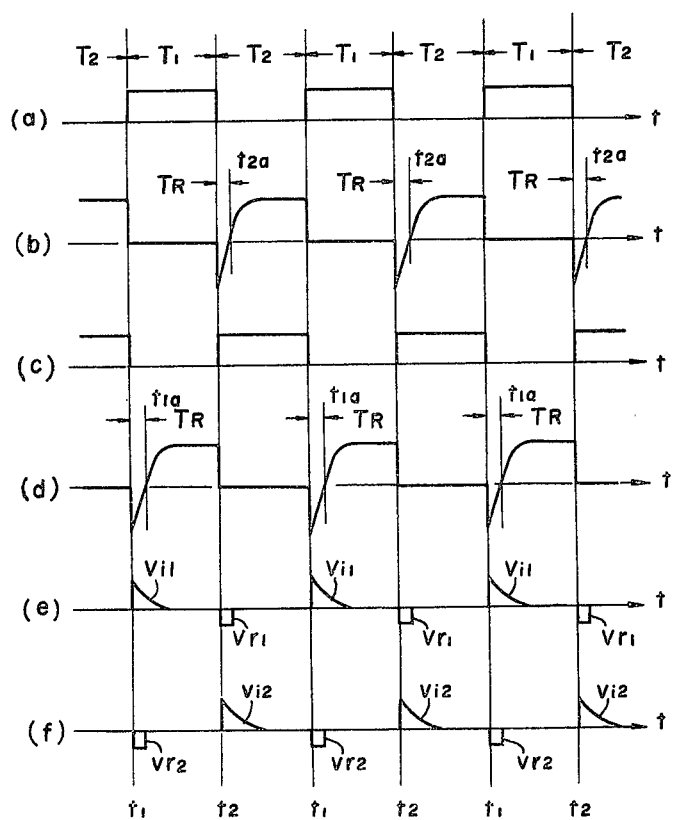
FIG. 2 shows waveform characteristics for illustrating the operation of the first type inverter.

The operation of the embodiment of FIG. 1 is illustrated in FIG. 2. FIG. 2a shows the waveform of current passing between the anode 11a and the cathode 11c of the thyristor 11; FIG. 2b shows the waveform of voltage applied between the anode and cathode of the thyristor 11; FIG. 2c shows the waveform of current passing between the anode and cathode of the thyristor 12; FIG. 2d shows the waveform of voltage applied between the anode and cathode of the thyristor 12; FIG. 2e shows the waveform of voltage applied between the gate and cathode of the thyristor 11; FIG. 2f shows the waveform of voltage applied between the gate and cathode of the thyristor 12. The quadrature axis of FIG. 2 is time axis $t$ which is common in FIG. 2a—f.

At the time $t_1$ in FIG. 2, the thyristor 11 is turned on and the thyristor 12 is simultaneously turned off. At the time $t_2$, the thyristor 11 is turned off and the thyristor 12 is simultaneously turned on. During the time period $T_1$ from the time $t_1$ to $t_2$, the thyristor 11 is turned on and the thyristor 12 is turned off. During the time period $T_2$ from time $t_2$ to $t_1$, the thyristor 11 for turned off and the thyristor 12 is turned on. At time $t_1$, the ignition signal $V_{i1}$ of FIG. 2e is applied between the gate and cathode of the thyristor 11 for turning on thyristor 11. The ignition signal $V_{i1}$ passes ignition current from the gate 11g to the cathode 11c of the thyristor whereby the thyristor 11 is turned on and the current of FIG. 2a begins to pass from the anode 11a to the cathode 11c of the thyristor 11. The current passes from the positive terminal 1p of the DC power source 1 through the middle terminal 4c of the primary coil 4 of the transformer 3, the first coil part 4A, the terminal 4a, the primary coil 23 of the transformer 22, the anode 11a and the cathode 11c of the thyristor 11 to the negative terminal 1n of the DC power source 1.

The turn-off operation of the thyristor 12 at the time $t_1$ is performed as follows. During the time period $T_2$ before the time $t_1$, the thyristor 12 is turned off whereby the commutation capacitor 6 is charged to give the polarity shown in FIG. 1. The charge of the capacitor 6 is accomplished by passing the charging current from the positive terminal 1p of the DC power source 1 through the middle terminal 4c of the primary coil 4 of the transformer 3, the first coil part 4A, the terminal 4a, the condenser 6, the anode and cathode of the thyristor 12 to the negative terminal 1n of the DC power source 1. When the thyristor 11 is turned on at the time $t_1$, the voltage of the capacitor 6 charged to the polarity shown in FIG. 1 is applied as reverse voltage to give positive polarity to the cathode 12c of the thyristor 12 through the path from the terminal 6a of the capacitor 6, the primary coil 23 of the transformer 22, the thyristor 11, the thyristor 12, the primary coil 27 of the transformer 26 to the terminal 6b of the capacitor 6 in order to initiate the turn-off operation of thyristor 12. When the thyristor 11 is turned on at the time $t_1$, current begins to pass from the anode 11a to the cathode 11c. As the current passes through the primary coil 23 of the transformer 22, a voltage is induced in the secondary coil 24 to give a positive polarity to the terminal 24a. This voltage is applied through the path from the terminal 24a of the secondary coil 24 through the cathode 12c and gate 12g of the thyristor 12, the resistor 32, and the diode 31 to the terminal 24b whereby the reverse bias voltage $V_{r2}$ of FIG. 2f is applied between the gate and cathode of the thyristor 12. The reverse bias voltage $V_{r2}$ promotes the turn-off operation of the thyristor 12 whereby the turn-off time of the thyristor 12 is shortened.

The thyristor 12 is turned on at the time $t_2$ by the ignition signal $V_{i2}$ shown in FIG. 2f which is transmitted from the ignition circuit 14. The thyristor 11 is turned off by the turn-on of the thyristor 12. The capacitor 6 is charged to a polarity opposite to that shown in FIG. 1 whereby a reverse voltage is applied between the anode and cathode of the thyristor 11 when turning on the thyristor 12. A voltage which gives a positive polarity to the terminal 28a is induced in the secondary coil 28 of the transformer 26 by the turn-on of the thyristor 12 whereby the reverse bias voltage $V_{r1}$ shown in FIG. 2e is applied between the gate 11g and the cathode 11c of the thyristor 11. The reverse bias voltage $V_{r1}$ promotes the turn-off operation of the thyristor 11 to shorten the turn-off time of the thyristor 11.

A voltage which gives a positive polarity to the terminal 28b is induced in the secondary coil 28 of the transformer 26 by beginning the turn-off operation of the thyristor 12 at the time $t_1$. A voltage which gives a polarity to the terminal 24b is induced in the secondary coil 24 of the transformer 22 by beginning the turn-off operation of the thyristor 11 at the time $t_2$. The induced voltages are not applied between the gate and cathode of the thyristor 11 or between the gate and cathode of the thyristor 12 because the diodes 33, 31 prevent it. A transient voltage which gives a positive polarity to the terminal 27b is generated in the primary coil 27 of the transformer 26 by beginning the turn-off operation of the thyristor 12 at the time $t_1$. A transient voltage which gives a positive polarity to the terminal 23b is generated in the primary coil 23 of the transformer 22 by beginning the turn-off operation of the thyristor 11 at the time $t_2$. The transient voltage is fly-wheeled by fly-wheel diodes 36, 35.

Induced voltages of different polarities are alternatively generated in the secondary coil 5 of the transformer 3, whereby the AC power based on the induced voltage is applied to the AC load 2.

Figure 3:
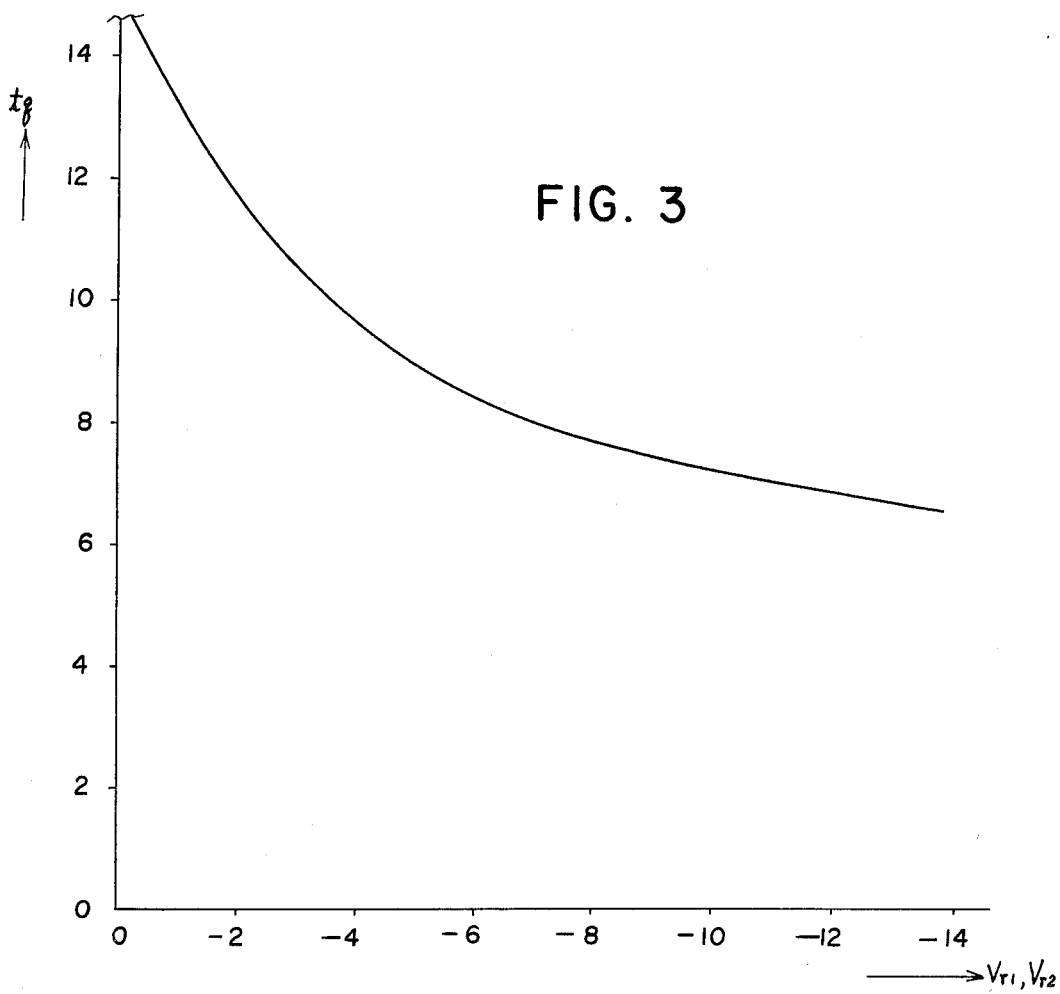
FIG. 3 shows a characteristic curve showing the relation of reverse bias voltage applied between the gate and cathode of the thyristor to the turn-off time of the thyristor.

FIG. 3 shows a characteristic curve showing the relation of the reverse bias voltage $V_{r1}$, $V_{r2}$ to the turn-off time $t_q$ of thyristors 11, 12. Thyristors 11, 12 have 15 $\mu$s of turn-off time at zero reverse bias voltage $V_{r1}$, $V_{r2}$. The quadrature axis shows the value of the reverse bias voltage $V_{r1}$, $V_{r2}$ and the ordinate axis shows the turn-off time $t_q$. When the reverse bias voltages $V_{r1}$, $V_{r2}$ having peak voltages of 10 volts are respectively applied according to the invention, the turn-off time $t_q$ is shortened to about 7.3 $\mu$s. The turn-off of the thyristors 11, 12 can be respectively attained by applying the reverse voltage between the anode and cathode of each thyristor 11, 12 for a time period equal to or longer than the turn-off time $t_q$. That is, it is necessary to continuously apply the reverse voltage for longer than the turn-off time $t_q$ in order to turn-off the thyristor. In FIG. 2b, d, the reverse voltage is continuously applied from the time $t_2$, $t_1$ to the time $t_{2a}$, $t_{1a}$. The time period during which the reverse voltage is applied is indicated as $T_R$. When the turn-off time $t_q$ of each thyristor 11, 12 is shortened by applying the reverse bias voltage $V_{r1}$, $V_{r2}$, the time period $T_r$ can be shortened whereby the commutation capacitor 6 can be compacted in the embodiment of FIG. 1. Each reverse bias voltage $V_{R1}$, $V_{R2}$ can be applied for a time substantially equal to the turn-off time $t_q$ for each thyristor 11, 12.

Figure 4:
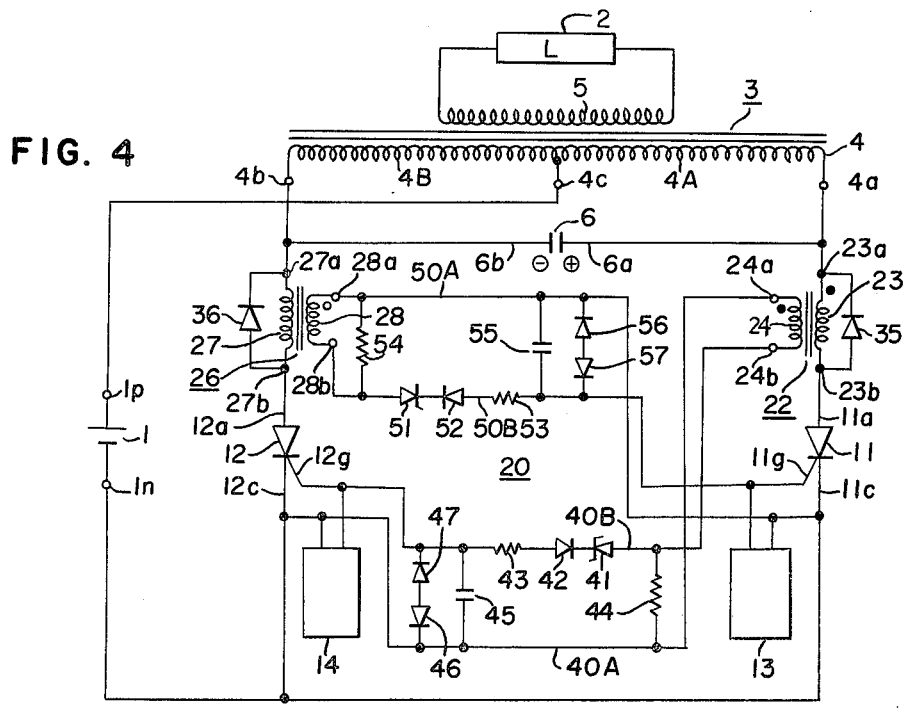
FIG. 4 is an electrical circuit diagram showing a modified first type inverter according to the invention.

FIG. 4 shows a modified parallel type inverter according to the invention. The inverter comprises a modified secondary circuit of each transformer 22, 26. The terminal 24a of the secondary coil 24 of the transformer 22 is connected to the cathode 12c of the thyristor 12 by the line 40A; the other terminal 24b is connected through the line 40B comprising the zener diode 41, the diode 42, the resistor 43 and the gate 12g of the thyristor 12. The anode of the zener diode 41 is connected to the terminal 24b and the cathode of the diode 42 is connected to the cathode of the zener diode 41. The anode of the diode 42 is connected through the resistor 43 to the gate 12g of the thyristor 12. The resistor 44 is connected between the terminals 24a, 24b and the capacitor 45 is connected between the gate and cathode of the thyristor 12. The series circuit of the zener diode 46 and the diode 47 is connected between the gate and cathode of the thyristor 12. The anode of the zener diode 46 is connected to the anode of the diode 47. The cathode of the zener diode 46 is connected to the cathode of the thyristor 12. The cathode of the diode 47 is connected to the gate 12g of the thyristor 12.

The terminal 28a of the secondary coil 28 of the transformer 26 is connected through the line 50A to the cathode 11c of the thyristor 11. The other terminal 28b is connected through the line 40B comprising the zener diode 51, the diode 52, the resistor 53 and the gate 11g of the thyristor 11. The anode of the zener diode 51 is connected to the terminal 28b. The cathode of the diode 52 is connected to the cathode of the zener diode 51. The anode of the diode 52 is connected through the resistor 53 to the gate 11g of the thyristor 11. The resistor 54 is connected between the terminals 28a, 28b and the capacitor 55 is connected between the gate and cathode of the thyristor 11. The series circuit comprising the zener diode 56 and the diode 57 is connected between the gate and cathode of the thyristor 11. The anode of the zener diode 56 is connected to the anode of the diode 57. The cathode of the zener diode 56 is connected to the cathode 11c of the thyristor 11. The cathode of the diode 57 is connected to the gate 11g of the thyristor 11.

The operation of the diodes 42, 52 is similar to the operation of the diodes 31, 33 in the embodiment of FIG. 1. Each zener diode 41, 51 operates to prevent the bypass of ignition signals $V_{i2}$, $V_{i2}$ to transformers 22, 26 when ignition signals $V_{i2}$, $V_{i1}$ transmitted from ignition circuits 14, 13 are lower than the zener voltage. Capacitors 45, 55 operate to bypass high frequency noise generated in secondary coils 24, 28 of transformers 22, 26 so as to prevent applying the noise between the gate and cathode of thyristors 12, 11. Zener diodes 46, 56 operate to by-pass reverse bias voltages $V_{r2}$, $V_{r1}$ when reverse bias voltages $V_{r2}$, $V_{r1}$ applied from transformers 22, 26 to thyristors 12, 11 are in excess of the zener voltage thereby preventing the application of excess reverse bias voltages $V_{r2}$, $V_{r1}$ between the cathodes and gates of thyristors 12, 11. Diodes 47, 57 block ignition signals $V_{i2}$, $V_{i1}$ to prevent the by-pass of ignition signals through zener diodes 46, 56.

Figure 5:
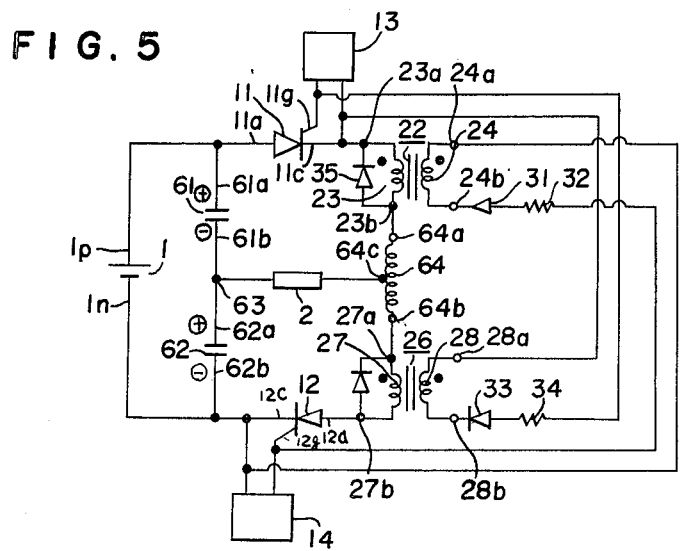
FIG. 5 is an electrical circuit diagram showing a second type inverter according to the invention.

FIG. 5 shows a series type inverter according to the invention. The inverter comprises a DC power source, two commutation capacitors 61, 62 connected in series; and a commutation reactor 64. The terminal 61a of the capacitor 61 is connected to the positive polarity terminal 1p of DC power source 1. The terminal 62b of the capacitor 62 is connected to the negative terminal 1n. The terminal 61b of the capacitor 61 is connected to the terminal 62a of the capacitor 62 at the connecting point 63. The commutation reactor 64 comprises a middle terminal 64c between terminals 64a, 64b. The AC load 2 is connected between the middle terminal 64c and the connecting point 63.

The series circuit comprising the thyristor 11 and the primary coil 23 of the transformer 22 is connected between the positive terminal 1p of the DC power source 1 and the terminal 64a of the reactor 64. The series circuit comprising the thyristor 12 and the primary coil 26 of the transformer 26 is connected between the negative terminal 1n of the DC power source 1 and the terminal 64b of the reactor 64. The anode 11a of the thyristor 11 is connected to the positive terminal 1p and the DC power source 1. The cathode 11c is connected to the terminal 23a of the primary coil 23. The terminal 23b of the primary coil 23 is connected to the terminal 64a of the reactor 64. The cathode 12c of the thyristor 12 is connected to the negative terminal 1n of the DC power source 1. The anode 12a is connected to the terminal 27b of the primary coil 27. The terminal 27a of the primary coil 27 is connected to the terminal 64b of the reactor 64.

Ignition circuits 13, 14 are similar to those shown in FIG. 1 and are connected between the gates and cathodes of thyristors 11, 12. The connection circuit connecting the secondary coil 24 of the transformer 22 to the gate and cathode of the thyristor 12 and the connection circuit connecting the secondary coil 28 of the transformer 26 to the gate and cathode of the thyristor 11 are similar to that shown in FIG. 1.

Figure 6:
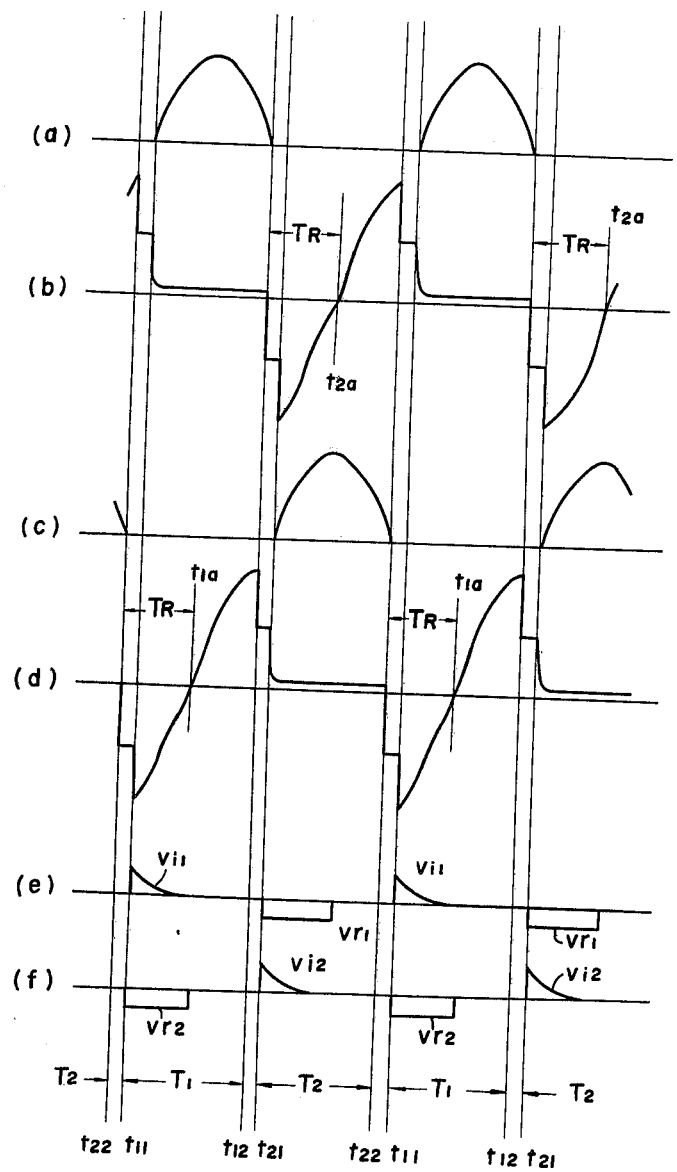
FIG. 6 shows waveforms for illustrating the operation of the second type inverter.

Referring to FIG. 6, the operation of the inverter of FIG. 5 is illustrated. FIG. 6a shows a waveform of current passing between the anode 11a and the cathode 11c of the thyristor 11; FIG. 6b shows a waveform of voltage applied between the anode and cathode of the thyristor 11; FIG. 6c shows a waveform of current passing between the anode and cathode of the thyristor 12; FIG. 6d shows a waveform of voltage applied between the anode and cathode of the thyrsitor 12; FIG. 6e shows a waveform of voltage applied between the gate and cathode of the thyristor 11 and FIG. 6f shows a waveform of voltage applied between the gate and cathode of the thyristor 12.

The quadrature axis is time axis $t$. At the time $T_{11}$ of FIG. 6, the thyristor 11 is turned on. At the time $t_{21}$, the thyristor 12 is turned on. At the time $t_{12}$, the thyristor 11 is turned off. At the time $t_{22}$, the thyristor 12 is turned off. During the time period $T_1$ from the time $t_{11}$ to $t_{12}$, the thyristor 11 is turned on and the thyristor 12 is turned off or in the turn-off operation. During the time period $T_2$ from the time $t_{21}$ to $t_{22}$, the thyristor 12 is in turned on and the thyristor 11 is turned off or in the turn-off operation. In order to turn on the thyristor 11 at the time $t_{11}$, the ignition signal $V_{ii}$ of FIG. 6e is applied between the gate and cathode of the thyristor 11 from the ignition circuit 13 whereby the thyristor 11 is turned on and the current passes in the path from the positive terminal 1p of the DC power source 1 through the anode 11a and the cathode 11c of the thyristor 11, the primary coil 23 of the transformer 22, the terminals 64a, 64c of the reactor 64, the AC load 2, the capacitor 62 to the negative terminal 1n of the DC power source 1. The current charges the capacitor 62 to the positive polarity of the terminal 62a as shown in FIG. 5.

The current is blocked at the time $t_{12}$ by the resonance of the reactor 64 and the capacitor 62 whereby current passes during the time period $T_1$. During the time period $T_1$, the capacitor 61, which has been charged to give a positive polarity to the terminal 61a shown in FIG. 5, is discharged through the path from the terminal 61a through the thyristor 11, the primary coil 23 of the transformer 22, the terminals 64a, 64c of the reactor 64, the load 2 to the terminal 61b. The discharge of the capacitor 61 is stopped in the state that the capacitor 61 has been charged in order to give the polarity opposite to that shown in FIG. 5. At that time $t_{21}$, the ignition signal $V_{i2}$ shown in FIG. 6f is applied between the gate and cathode of the thyristor 12 from the ignition circuit 14 in order to turn on the thyristor 12. As a result, the thyristor 12 is turned on whereby the current begins to pass in the path from the positive terminal 1p of the DC power source 1 through the capacitor 61, the load 2, the terminals 64c, 64b of the reactor 64, the primary coil 27 of transformer 26, the anode 12a and the cathode 12c of the thyristor 12 to the negative terminal 1n of the DC power source 1. The current charges the capacitor 61 to give the polarity as shown in FIG. 5. The current is blocked at the time $t_{22}$ by the resonance of the reactor 64 and the capacitor 61 whereby the current passes during the time period $T_2$.

During the time period $T_2$, the capacitor 62 which has been charged during the time period $T_1$ to give the polarity shown in FIG. 5, is discharged in the path from the terminal 62a through the load 2, the terminals 64c, 64b of the reactor 64, the primary coil 27 of the transformer 26, the thyristor 12 to the terminal 62b. The discharge of the capacitor 62 is stopped in the state that the capacitor 62 has been charged to in order to yield a polarity opposite to that of FIG. 5.

The turn-off operation of the thyristor 12 begins at the time $t_{22}$. At the time $t_{22}$, the capacitor 62 is charged to the polarity opposite to that of FIG. 5 and the voltage of the capacitor 62 is applied as a reverse voltage to give a positive polarity to the cathode 12c through the path comprising the load 2, the terminals 64c, 64b of the reactor 64, the primary coil 27 of the transformer 26 and the thyristor 12. When the thyristor 11 is turned on at the time $t_{11}$ as shown in FIG. 6d, reverse voltage increases by the voltage of the capacitor 61 having the polarity of FIG. 5. Moreover, the induced voltage which gives a positive polarity to the terminal 24a is generated in the secondary coil 24 of the transformer 22 by the turn-on of the thyristor 11. The reverse bias voltage $V_{r2}$ which gives a positive polarity to the cathode 12c is applied between the cathode and gate of the thyristor 12 by the induced voltage whereby the turn-off operation of the thyristor 12 is promoted.

The turn-off operation of the thyristor 11 begins at time $t_{12}$. At time $t_{12}$, the capacitor 61 is charged to a polarity opposite to that of FIG. 5. The voltage of the capacitor 61 is applied as a reverse voltage to give a positive polarity to the cathode 11c through the path comprising the load 2, the reactor 64, the primary coil 23 of the transformer 22 and the thyristor 11. When the thyristor 12 is turned on at time $t_{21}$, as shown in FIG. 6b, reverse voltage increases by the voltage of the capacitor 62 having the polarity of FIG. 5. Moreover, the induced voltage which gives a positive polarity to the terminal 28a is generated in the secondary coil 28 of the transformer 26 by the turn-on of the thyristor 12.

The reverse bias voltage $V_{r1}$ which gives a positive polarity to the cathode 11c is applied between the gate and cathode of the thyristor 11 by the induced voltage whereby the turn-off operation of the thyristor 11 is promoted. The time period for applying reverse voltage $T_R$ is from the time $t_{12}$ to $t_{2a}$ for the thyristor 11 and is from the time $t_{22} - t_{1a}$ for the thyristor 12.

Figure 7:
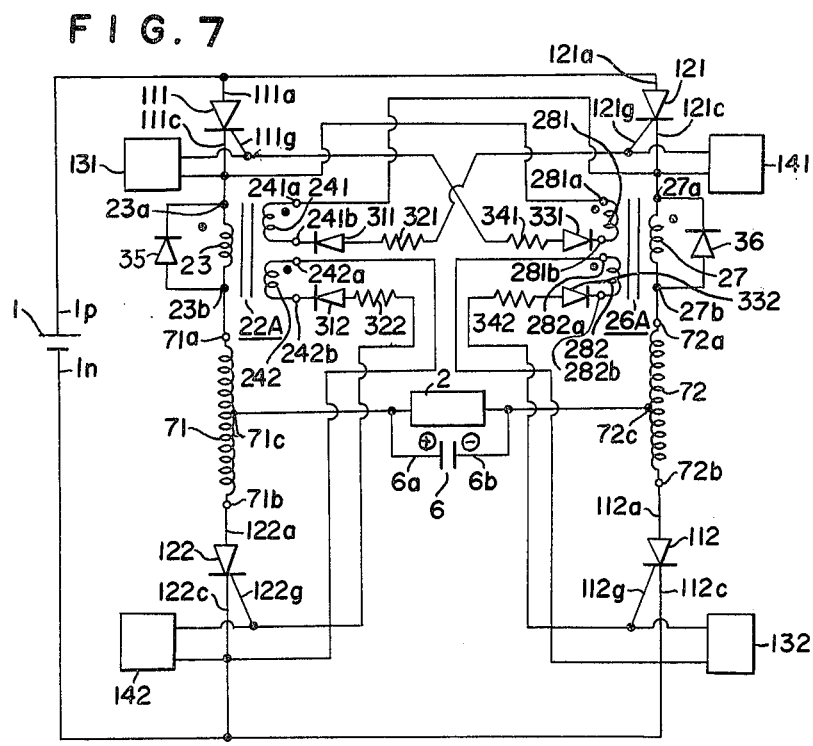
FIG. 7 is an electrical circuit diagram showing a third type inverter according to the invention.

FIG. 7 shows a bridge type inverter according to the invention. The inverter comprises a DC power source 1, a pair of commutation reactors 71, 72 an AC load 2 and a commutation capacitor 6. Reactors 71, 72 have terminals 71a, 71b; 72a, 72b; together with middle terminals 71c, 72c. The AC load 2 is connected between the middle terminals 71c, 72c, and the capacitor 6 is connected in parallel to the AC load 2. The inverter comprises four thyristors 111, 112, 121, 122 which are, respectively, three terminals thyristors. Anodes 111a, 121a of thyristors 111, 121 are connected to the positive terminal 1p of the DC power source 1. Cathode 112c, 122c of thyristors 112, 122 are connected in the negative terminal 1n. Thyristors 111, 112, 121, 122 are connected to ignition circuits 131, 132, 141, 142 which are connected between the gates and cathodes of the thyristors. Each ignition signal gives a positive polarity to the gate to which it is applied.

The embodiment of FIG. 7 includes a pair of transformers 22A, 26A. The transformer 22A comprises input coil 23 and a pair of output coils 241, 242. The transformer 26A comprises input coil 27 and a pair of output coils 281, 282. The terminal 241a of output coil 241 is connected to the cathode 121c of the thyristor 121. The terminal 241b is connected through the diode 311, the resistor 321 to the gate 121g. The terminal 242a of the output coil 242 is connected to the cathode 122c of the thyristor 122. The terminal 242b is connected through the diode 312 and the resistor 322 to the gate 122g. Terminal 281a of output coil 281 is connected to the cathode 111c of the thyristor 111. Terminal 281b is connected through the diode 331 and the resistor 341 to the gate 111g. Terminal 282a of output coil 282 is connected to the cathode 112c of the thyristor 112. Terminal 282b is connected through the diode 332 and the resistor 342 to the gate 112g.

The cathodes of diodes 311, 312, 331, 332 are connected to terminals 241b, 242b, 281b, 282b. Terminal 23a of input coil 23 of transformer 22A is connected to the cathode 11c of the thyristor 111. Terminal 23b is connected to the terminal 71a of the reactor 71. Terminal 27a of input coil 27 of transformer 26A is connected to cathode 121c of thyristor 121. Terminal 27b is connected to terminal 72a of reactor 72. The terminal 71b of the reactor 71 is connected to the anode 122a of the thyristor 122. The terminal 72b of the reactor 72 is connected to the anode 112a of the thyristor 112.

Ignition circuits 131, 132 simultaneously apply ignition signals to thyristors 111, 112 to simultaneously turn-on thyristors 111, 112. Current is passed by the turn-on of thyristors 111, 112, in the path from positive terminal 1p through the anode 111a and cathode 111c of the thyristor 111, the input coil 23 of the transformer 22A, the terminals 71a, 71c of the reactor 71, the load 2, the terminals 72c, 72b of the reactor 72, the anode 112a and the cathode 112c of the thyristor 112 to the negative terminal 1n of the DC power source 1, and the capacitor 6 is simultaneously charged. The capacitor 6 charges to give a positive polarity to the terminal 6a connected to the middle terminal 71c of the reactor 71 as shown in FIG. 7.

Ignition circuits 141, 142 simultaneously apply ignition signals to thyristors 121, 122 to simultaneously turn-on thyristors 121, 122. Current is passed by the turn-on of thyristors 121, 122 in the path from the positive terminal 1p of the DC power source 1 through the anode 121a and cathode 121c of the thyristor 121, the input coil 27 of the transformer 26A, the terminals 72a, 72c of the reactor 72, the load 2, the terminals 71c, 71b of the reactor 71, the anode 122a and cathode 122c of the thyristor 122 to the negative terminal 1n of the DC power source 1 and the capacitor 6 is simultaneously charged to give a polarity opposite to that of FIG. 7. The turn-on of thyristors 111, 112 turns off the thyristors 121, 122.

The turn-off operation of thyristors 121, 122 is as follows. The voltage of the capacitor 6 charged to the polarity opposite to that of FIG. 7 is applied as a reverse voltage between the anode and cathode of thyristors 121, 122 by the turn-on of the thyristors 111, 112, whereby the turn-off operation of thyristors 121, 122 is initiated. Moreover, the induced voltage which gives a positive polarity to terminals 241a, 242a is generated in output coils 241, 242 of the transformer 22A by the turn-on of the thyristors 111, 112 and the reverse bias voltage is applied between the gates and cathodes of thyristors 121, 122 by the induced voltage whereby the turn-off operation of thyristor 121, 122 is promoted.

The turn-on thyristors 121, 122 turns-off thyristors 111, 112. The turn-off operation of thyristors 111, 112 is as follows. The voltage of the capacitor 6 charged to the polarity of FIG. 7 is applied as a reverse voltage between the anode and cathode of thyristors 111, 112 by the turn-on of the thyristors 121, 122 whereby the turn-off operation of the thyristors 111, 112 is initiated. Moreover, the induced voltage which gives a positive polarity to terminals 281a, 282a is generated in output coils 281, 282 of the transformer 26A by the turn-on of the thyristors 121, 122 and the reverse bias voltage is applied between the gate and cathode of thyristors 111, 112 by the induced voltage whereby the turn-off operation of each thyristor 111, 112 is promoted.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. An electrical circuit comprising:
   at least one pair of thyristors each having an anode, cathode and gate;
   the first thyristor being turned off when turning on the second thyristor and the second thyristor being turned off when turning on the first thyristor;
   a pair of transformers;
   the first transformer directly applying reverse bias voltage between the gate and cathode of the second thyristor when turning on the first thyristor;
   the second transformer directly applying reverse bias voltage between the gate and cathode of the first thyristor when turning on the second thyristor.

2. The electrical circuit according to claim 1 wherein said first transformer comprises an input coil connected in series to the anode and cathode of said first thyristor and an output coil connected between the gate and cathode of said second thyristor; said second transformer comprises an input coil connected in series to the anode and cathode of said second thyristor and an output coil connected between the gate and cathode of said first thyristor.

3. An electrical circuit comprising:
   at least one pair of thyristors each having an anode, cathode and gate;
   the first thyristor being turned off when turning on the second thyristor and the second thyristor being turned off when turning on the first thyristor;
   a pair of transformers;
   the first transformer applying reverse bias voltage between the gate and cathode of the second thyristor when turning on the first thyristor;
   the second transformer applying reverse bias voltage between the gate and cathode of the first thyristor when turning on the second thyristor;
   said first transformer comprising an input coil connected in series to the anode and cathode of said first thyristor and an output coil connected between the gate and cathode of said second thyristor;
   said second transformer comprising an input coil connected in series to the anode and cathode of said second thyristor and an output coil connected between the gate and cathode of said first thyristor;
   a first diode connected to the circuit connecting the output coil of said first transformer between the gate and cathode of said second thyristor;
   a second diode connected to the circuit connecting the output coil of said second transformer to the circuit connecting the gate and cathode of said first thyristor;
   said first diode blocking the induced voltage generated in the output coil of said first transformer by the turn-off of said first thyristor;
   said second diode blocking the induced voltage generated in the output coil of said second transformer by the turn-off of said second thyristor.

4. An electrical circuit comprising:
   at least one pair of thyristors each having an anode, cathode and gate;
   the first thyristor being turned off when turning on the second thyristor and the second thyristor being turned off when turning on the first thryistor;
   a pair of transformers;
   the first transformer applying reverse bias voltage between the gate and cathode of the second thyristor when turning on the first thyristor;
   the second transformer applying reverse bias voltage between the gate and cathode of the first thyristor when turning on the second thyristor;
   said first transformer comprising an input coil connected in series to the anode and cathode of said first thyristor and an output coil connected between the gate and cathode of said second thyristor;
   said second transformer comprising an input coil connected in series to the anode and cathode of said second thyristor and an output coil connected between the gate and cathode of said first thyristor;
a first zener diode connected between the gate and cathode of said first thyristor;
a second zener diode connected between the gate and cathode of said second thyristor;
whereby said zener diodes by-pass reverse bias voltage in excess of the zener voltage.

5. The electrical circuit according to claim 4 wherein a third diode is connected in series to said first zener diode and a fourth diode is connected in series to said second zener diode whereby said diodes prevent the by-pass of ignition signals by said zener diodes.

6. An electrical circuit comprising:
at least one pair of thyristors each having an anode, cathode and gate;
the first thyristor being turned off when turning on the second thyristor and the second thyristor being turned off when turning on the first thyristor;
a pair of transformers;
the first transformer applying reverse bias voltage between the gate and cathode of the second thyristor when turning on the first thyristor;
the second thyristor applying reverse bias voltage between the gate and cathode of the first thyristor when turning on the second thyristor;
a DC power source having first and second terminals;
the third transformer having an input coil and output coil, said input coil of said third transformer having first and second terminals and a middle terminal;
said middle terminal being connected to the first terminal of the DC power source;
said first thyristor being connected between the first terminal of the input coil of said third transformer and the second terminal of the DC power source;
said second thyristor being connected between the second terminal of the input coil of said third transformer and the second terminal of the DC power source.

7. The electrical circuit according to claim 6 wherein said first transformer is connected in series to said first thyristor between the first terminal of the input coil of said third transformer and the second terminal of the DC power source; and
said second transformer is connected in series to said second thyristor between the second terminal of said third transformer and the second terminal of the DC power source.

8. An electrical circuit comprising:
at least one pair of thyristors each having an anode, cathode and gate;
a first thyristor being turned off when turning on the second thyristor and the second thyristor being turned off when turning on the first thyristor;
a pair of transformers;
the first transformer applying reverse bias voltage between the gate and cathode of the second thyristor when turning on the first thyristor;
the second transformer applying reverse bias voltage between the gate and cathode of the first thyristor when turning on the second thyristor; p1 a DC power source having first and second terminals;
a pair of commutation capacitors connected in series with each other between the terminals of the DC power source;
a commutation reactor having first and second terminals and a middle terminal;
a load connected between the connecting point of the pair of the commutation capacitors and the middle terminal of the commutation reactor;
said first thyristor being connected between the first terminal of the commutation reactor and the first terminal of the DC power source;
said second thyristor being connected between the second terminal of the commutation reactor and the second terminal of the DC power source.

9. The electrical circuit according to claim 8 wherein said first transformer is connected in series to said first thyristor between the first terminal of the commutation reactor and the second terminal of the DC power source, and
said second transformer is connected in series to said second thyristor between the second terminal of the commutation reactor and the second terminal of the DC power source.

10. An electrical circuit for a bridge type inverter which comprises:
a DC power source having first and second terminals;
a pair of commutation reactors which have respectively, a middle terminal between first and second terminals;
a load connected between the middle terminals of the pair of commutation reactors;
a commutation capacitor connected in parallel to the load;
first and second thyristors each having an anode, cathode and gate;
said first thyristor being connected between the first terminal of said first reactor and the first terminal of the DC power source;
said second thyristor being connected between the first terminal of said second reactor and the first terminal of the DC power source;
said second thyristor being turned off by the turn on of said first thyristor;
said first thyristor being turned off by the turn on of said second thyristor;
third and fourth thyristors each having an anode, cathode and gate;
said third thyristor being connected between the second terminal of said second reactor and the second terminal of the DC power source;
said fourth thyristor being connected between the second terminal of said first reactor and the second terminal of the DC power source;
said third thyristor being simultaneously controlled with said first thyristor and said fourth thyristor being simultaneously controlled with said second thyristor,
a transformer circuit for applying reverse voltage between the gate and cathode of said second and fourth thyristors by the turn-on of said first and third thyristors and for applying reverse voltage between the gate and cathode of said first and third thyristors by the turn-on of said second and fourth thyristors.

11. The electrical circuit according to claim 10 wherein said transformer circuit comprises first and second transformers, said first transformers comprising an input coil excited by current passing through said first and third thyristors and a pair of output coils connected between the gate and cathode of each of said second and fourth thyristors;
said second transformer comprising an input coil excited by current passing through said second and fourth thyristors and a pair of output coils connected between the gate and cathode of each of said first and third thyristors.

* * * * *